Nov. 26, 1929.  B. v. WYSOCKI  1,736,811
ELECTRICAL CONDENSER
Filed March 29, 1927
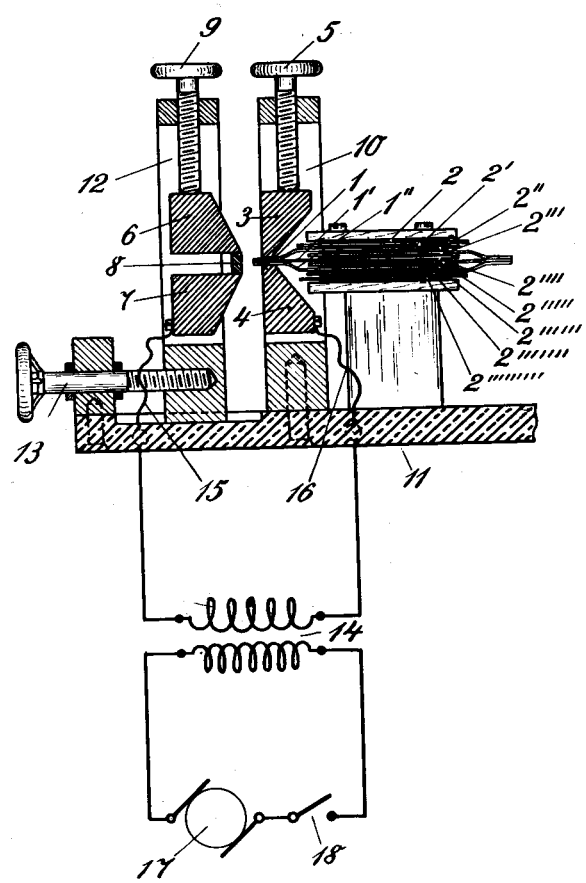
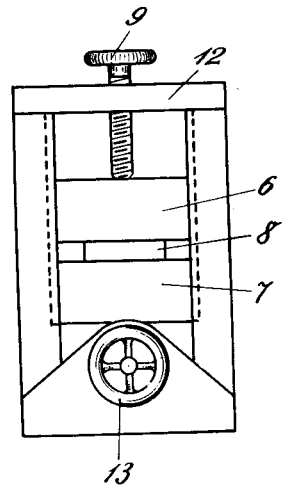
Inventor:
Bronislaw v. Wysocki
by
Attorney Patented Nov. 26, 1929

1,736,811

UNITED STATES PATENT OFFICE

BRONISLAW V. WYSOCKI, OF BERLIN-LICHTERFELDE, GERMANY, ASSIGNOR TO C. LORENZ AKTIENGESELLSCHAFT, OF BERLIN-TEMPELHOF, GERMANY

ELECTRICAL CONDENSER

Application filed March 29, 1927, Serial No. 181,597, and in Germany March 31, 1926.

The present invention relates to a process for the manufacture of electrical condensers. As is well known, in manufacturing such condensers, it is necessary to connect a determined number of metal plates in parallel in order to obtain a sufficiently large capacity. To that end, the metal plates, which usually have projections at the opposite sides of the condenser, have been electrically connected together either by means of clamp connections or by soldering. Whilst clamp connections or binding screws require a comparatively large space beyond the effective area of the plates, the other method, namely by soldering, involves the drawback that it is not always possible to prevent the soldering grease or like flux from getting between the plates and causing short-circuiting of the condenser.

It is already known to connect a large number of fine wires to cable lugs or the like by combining the wires to form a solid body with a flat end portion, and electrically connecting the latter to the cable lug by a welding process. According to the present invention, such a process is utilized in the manufacture of electrical condensers, the group of metal plates combined each comprising a solid body with a flat projection or end portion, which end portions of the plates are electrically connected together by welding a mass of metal on to the latter. For this purpose it has been found advantageous to use the burning-off or melting-off (arc-welding) process well known in itself. The condensers thus manufactured have a considerably smaller volume for a given capacity than those previously known and the objections to soldering are avoided. The masses of metal can at the same time be shaped so as to be used as the condenser terminals.

The invention may be more fully understood by the following description of an apparatus for carrying it into practice, as shown in the accompanying drawing, in which:

Figure 1 is a sectional view through the apparatus.

Figure 2 is an end elevation thereof.

Referring to the drawing, the condenser plates 1, 1', 1" ..., etc., which are separated from each other in the usual manner by insulating layers 2, 2', 2" ..., etc. and which are to be connected together by a welding process in accordance with the invention, are clamped between a pair of adjustable and fixed gripping jaws 3 and 4, respectively, the jaw 3 being adjustable toward and from the jaw 4 by a screw 5. A similar pair of gripping jaws 6 and 7 is arranged opposite the jaws 3 and 4 to hold a piece of metal 8 constituting the mass to be welded onto the end portions of the condenser plates 1, 1', 1" ..., etc., the jaw 6 being adjustable toward and from jaw 7 by a screw 9. The jaws 3 and 4 are mounted on a support 10 fixed on a base plate 11, while the jaws 6 and 7 are mounted on a support 12 movable with respect to the support 10 by means of a set screw 13. Adjustability of support 12 enables the welding mass 8 and the end portions of the condenser plates to be brought into a desired distance relationship until an electric arc discharge takes place between them, introducing a tight welding connection of the condenser plates. For this purpose the jaws 4 and 7 are connected to the secondary of a welding transformer 14 by means of leads 15 and 16. The primary of the transformer is supplied by a generator 17. 18 is an operating switch for closing the circuit whereby the apparatus is thrown into operation when the welding effect is desired and vice versa.

It will be observed that in the operation described the terminals to be welded are clamped between the jaws 3 and 4 in the region of, i. e., just in rear of their edges which are to be welded. The extent to which these edges project is such that in practice allowance is made for any manufacturing faults, such as rough edges, whereby the edges may be somewhat out of alinement, that is, will not lie flush with each other, which defect may also be due in some cases to faulty assemblage. If such defective terminals were joined by soldering or spot welding an unsightly or roughly finished article would result, and, in the case of soldering, an imperfect joint would in many cases be made and the rough edges would to a greater extent cause the retention of the flux. By the present method these objections are avoided, as, due to the formation of the arc in the gap between the condenser terminals and welding metal 8, while the latter is moving toward the condenser terminals, the roughened projections are burnt off and the edges of the terminals left smooth or flush at the moment they are raised with the metal 8 to the melting point and amalgamate therewith, so that a finely finished joint is produced. Owing also to the fact that an absolute amalgamation of the metal parts occurs, a homogeneous joint results which is solid throughout its entire area, thus providing a stronger construction than would be possible by soldering or spot welding. Also if there should be any slight gapping due to a bent terminal, this fault will be corrected by the flowing of the metals together at the welding moment. The method of uniting the terminals of the metal places of an electrical condenser, consists in holding said terminals in fixed relation to each other, disposing a piece of welding metal in proximity to but spaced from said terminals so as to form a gap between them and relatively moving said terminals and piece of welding metal toward each other and across said gap while simultaneously subjecting the same to the action of a current producing or welding arc in the gap whereby the terminals and welding piece will be fused and amalgamated on contact with each other.

Having now particularly described and ascertained the nature of my said invention and in what manner the same is to be performed, I declare that what I claim is:—

1. The method of uniting the terminals of the metal plates of an electrical condenser, which consists in holding said terminals in fixed relation to each other, disposing a piece of welding metal in proximity to but spaced from said terminals so as to form a gap between them, and bringing the terminals and welding metal together by relatively moving them across the gap toward each other while simultaneously passing an electric current through them so as to produce a welding arc across the gap acting to fuse said terminals and metal and amalgamate them on contact.

2. The method of uniting the terminals of the metal plates of an electrical condenser, which consists in clamping the terminals in fixed relation between clamping members, one of which at least forms a pole conductor of an electric circuit, clamping a piece of welding metal between jaws one of which at least forms the opposite pole of the electric circuit, and moving the latter-named jaws and piece of metal toward the condenser terminals from an initially spaced position while passing a current through said conducting poles whereby to cause the formation of an electric arc between the terminals and the welding piece across the intervening gap, acting to fuse said terminals and welding piece and to amalgamate them at the moment of contact.

In testimony whereof I have affixed my signature.

BRONISLAW v. WYSOCKI.